(12) United States Patent
Fujioka

(10) Patent No.: US 9,710,287 B2
(45) Date of Patent: Jul. 18, 2017

(54) INFORMATION PROCESSING DEVICE, INFORMATION PROCESSING SYSTEM, AND COMPUTER READABLE MEDIUM

(71) Applicant: PFU Limited, Kahoku-shi, Ishikawa (JP)

(72) Inventor: Ichiro Fujioka, Kahoku (JP)

(73) Assignee: PFU LIMITED, Ishikawa (JP)

( * ) Notice: Subject to any disclaimer, the term of this patent is extended or adjusted under 35 U.S.C. 154(b) by 162 days.

(21) Appl. No.: 14/169,987

(22) Filed: Jan. 31, 2014

(65) Prior Publication Data

US 2014/0289289 A1    Sep. 25, 2014

(30) Foreign Application Priority Data

Mar. 19, 2013  (JP) .................................. 2013-057106

(51) Int. Cl.
*G06F 17/30*   (2006.01)
*G06F 9/44*    (2006.01)

(52) U.S. Cl.
CPC ...... *G06F 9/4446* (2013.01); *G06F 17/30011* (2013.01)

(58) Field of Classification Search
None
See application file for complete search history.

(56) References Cited

U.S. PATENT DOCUMENTS

| | | | | |
|---|---|---|---|---|
| 2004/0220815 A1* | 11/2004 | Belanger | ................. | G06F 17/21 715/200 |
| 2005/0039118 A1* | 2/2005 | Gordon | ............... | G06F 17/3089 715/234 |
| 2006/0229954 A1 | 10/2006 | Nuno et al. | | |
| 2007/0240154 A1* | 10/2007 | Gerzymisch | ............. | G06F 8/61 717/174 |
| 2009/0048941 A1* | 2/2009 | Strassmann | ............ | G06Q 30/02 705/26.62 |
| 2009/0094328 A1* | 4/2009 | Goodman | .............. | G06Q 30/02 709/204 |

(Continued)

FOREIGN PATENT DOCUMENTS

| | | |
|---|---|---|
| CN | 1826616 A | 8/2006 |
| CN | 101640683 A | 2/2010 |

(Continued)

OTHER PUBLICATIONS

Microsoft Press Computer Dictionary, Second Edition, 1994, p. 266-267, "multiprocessing".*

(Continued)

*Primary Examiner* — Wilson Lee
(74) *Attorney, Agent, or Firm* — McDermott Will & Emery LLP

(57) ABSTRACT

There is provided an information processing device having: a distribution portion that distributes an update data to a client terminal updating, on the client terminal, a first manual information constituted as a structured document; a PDF generation portion that generates a PDF file having a second manual information updated with the update data; and a file storage portion that stores the PDF file generated by the PDF generation portion in a state allowing the client terminal which is a distribution destination of the update data to download the PDF file.

4 Claims, 16 Drawing Sheets

(56) References Cited

U.S. PATENT DOCUMENTS

| | | | | |
|---|---|---|---|---|
| 2009/0254523 A1* | 10/2009 | Lang | ................. | G06F 17/30864 |
| 2010/0030848 A1 | 2/2010 | Hidesawa | | |
| 2011/0173093 A1* | 7/2011 | Psota | ..................... | G06Q 30/06 |
| | | | | 705/26.35 |
| 2012/0191757 A1* | 7/2012 | Gross | ................ | G06Q 10/0633 |
| | | | | 707/781 |
| 2013/0212083 A1* | 8/2013 | Beattie | .............. | G06F 17/30864 |
| | | | | 707/707 |
| 2014/0237035 A1* | 8/2014 | Smith | ..................... | G06F 17/50 |
| | | | | 709/203 |
| 2015/0142560 A1* | 5/2015 | Singh | ................ | G06Q 30/0267 |
| | | | | 705/14.53 |
| 2015/0261872 A1* | 9/2015 | Amano | .................. | G05B 19/05 |
| | | | | 715/201 |

FOREIGN PATENT DOCUMENTS

| | | | |
|---|---|---|---|
| JP | 11-316636 A | 11/1999 |
| JP | 2002-182811 A | 6/2002 |
| JP | 2005-208881 A | 8/2005 |

OTHER PUBLICATIONS

English translation, Notification of Reasons for Refusal, Japanese Patent Application No. 2013-057106 dated May 24, 2016.
English translation Notification of Reasons for Refusal Chinese Patent Application No. 201410100742.1 dated Nov. 7, 2016.
Notification of Reasons for Refusal Chinese Patent Application No. 201410100742.1 dated Mar. 23, 2017 with full English translation.

* cited by examiner

Manual update system 1

Manual data update processing (S10)

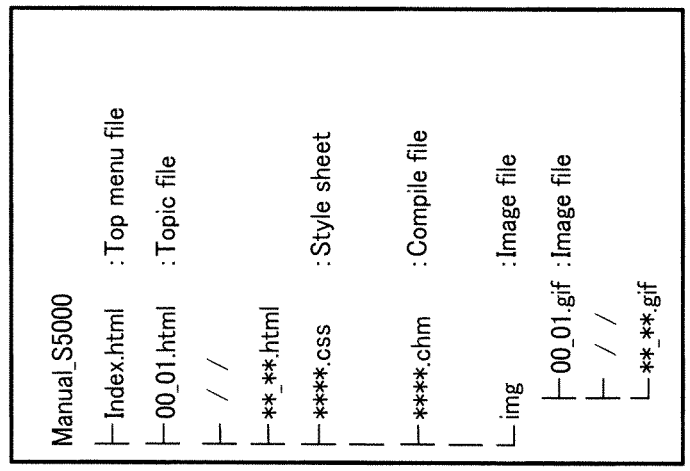
FIG. 8A
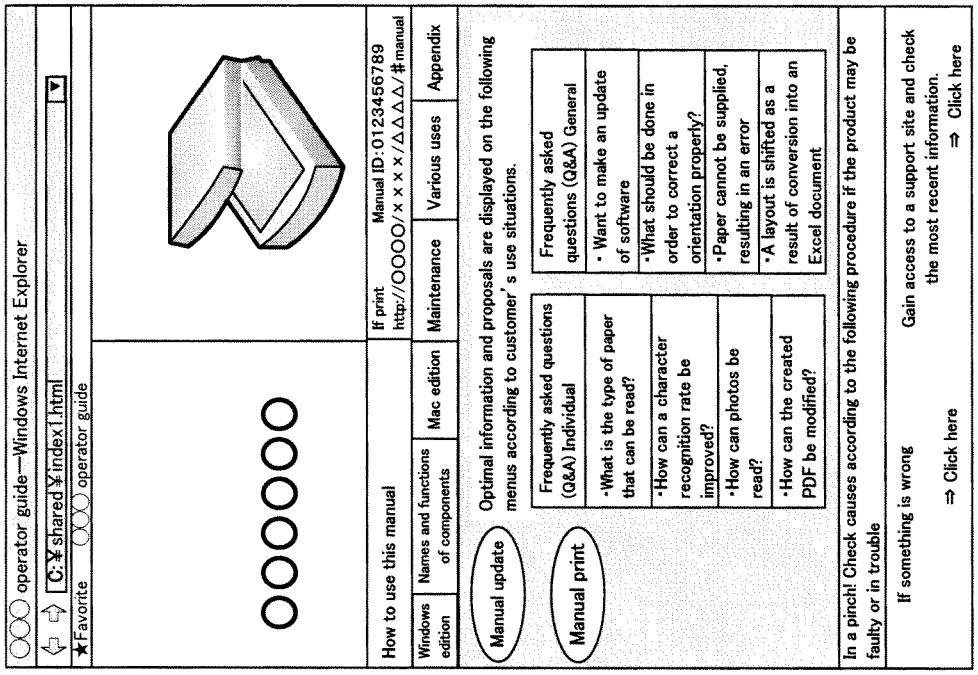

FIG. 9

```
Manual_Info.ini :   File name
        [MAIN]:   Basis information
        VL=01.01.02
        InstSize=60
        Filescount=20
        SetupPath="¥¥scanner¥manual"
        InstalledName="¥¥manual update V01L01.02"

[CHG_PARA]:   Change files information
        00_01.html
        05_04.html
        01_01.gif

[ADD_PARA]:   Addition files information
        00_01_01.html
        01_02_03.gif

[DEL_PARA]:   Deletion files information
        02_03.html
        02_04.gif
```

One example of control information (Ini files)

FIG. 10

Example of information of manual change/addition/deletion/PDF data items for each driver or software version number ※Contents number displays topic number

| Classification | Program name | Version number (the affect on manual) | Change contens | Addition contents | Deletion content | PDFdata |
|---|---|---|---|---|---|---|
| Driver | Manager | V1.1L30 | 1-2,1-3,1-4 | | | V1.1L30.pdf |
| | | V2.1L50 | 4-1 | | | V2.1L50.pdf |
| | | V3.1L10 | 4-1 | | | V3.1L10.pdf |
| | | V4.1L20 | 1-3,1-4 | 1-3-1 | 2-6 | V4.1L20.pdf |
| | | V4.1L30 | 2-3 | 1-3-1 | | V4.1L30.pdf |
| | | V.51L10 | 5-2 | | 3-5 | V.51L10.pdf |
| | | V.51L50 | 2-3 | 1-3-1 | | V.51L50.pdf |
| | Organizer | V1.1L20 | 3-2 | | | V1.1L20.pdf |
| | | V1.1L30 | 3-4 | | | V1.1L30.pdf |
| | | V2.1L10 | 2-1 | | 2-2 | V2.1L10.pdf |
| | | V3.1L10 | 4-2 | 4-2-1 | | V3.1L10.pdf |
| | | V4.1L60 | 5-3 | | | V4.1L60.pdf |
| Software | CardMinder | V1.1L20 | 1-2 | | | V1.1L20.pdf |
| | | V2.1L20 | 1-3 | | | V2.1L20.pdf |
| | | V3.1L10 | 2-4 | | | V3.1L10.pdf |
| | | V3.1L20 | 2-3 | 2-3-1 | | V3.1L20.pdf |

Update processing based on the control information (S20)

FIG. 12A

Extraction process 1: example of selecting a FAQ menu 114 based on device history information Top menu displays "Frequently asked questions (Q&A)"

| | FAQ items | Function use history | Error history | History total |
|---|---|---|---|---|
| Read images | 1. Compression format and compression rate? | 2 | | 2 |
| | 2. What is the resolution that can be set? | 4 | | 4 |
| | 3. What are paper sizes that can be indicated? | | | 0 |
| | 4. What are sizes of the file to be saved? | | | 0 |
| | 5. How does the file name? | | | 0 |
| | 6. Is possible to darken color of the read images? | 5 | | 5 |
| | 7. What are file formats that can be saved? | 3 | | 3 |

| | FAQ items | Function use history | Error history | History total |
|---|---|---|---|---|
| Office collaboration functions | 1. Why do some paper read have low recognition rate when executing ⟨Conversion into Word document⟩, ⟨Conversion into Excel document⟩, or ⟨Conversion into Power Point document⟩? | | | 0 |
| | 2. The results do not improve when an image was made excellent while executing ⟨Conversion into Word document⟩, ⟨Conversion into Excel document⟩, or ⟨Conversion into Power Point document⟩. | | | 0 |
| | 3. The conversion (recognition) changed based on color mode (black-and-white, color, gray) or the setting of the image quality. Which settings are optimal? | 1 | | 1 |
| | 4. ⟨Not enough memory!⟩ appeared when an image was made excelleNt while executing ⟨Conversion into Word document⟩ ⟨Conversion into Excel document⟩, or ⟨Conversion into Power Point document⟩. | 32 | 13 | 45 |
| | 5. The operation file has remained without being deleted when an image was made excelleNt while executing ⟨Conversion into Word document⟩, ⟨Conversion into Excel document⟩, or ⟨Conversion into Power Point document⟩. | | 4 | 4 |

Extraction condition → Select top four which having more history totals

▨ : Results of selection

FIG. 12B

| Mobile collaboration functions | FAQ items | Function use history | Error history | History total |
|---|---|---|---|---|
| | 1. Is collaboration with iPad, iPhone, and iPad touch possible? | | | 0 |
| | 2. Error messages of security displayed when launched the "Save to Mobile" in windows. | | 8 | 8 |
| | 3. Computer and mobile device (iPad/iPhone/iPad touch/Android terminal) cannot be connected to each other. | | 23 | 23 |
| | 4. Computer and mobile device (iPad/iPhone/iPad touch/Android terminal) cannot connect to each other, when the mobile save icon of taskbar of computer displayed a mark of prohibition. | | 3 | 3 |

| ScanSnap Organizer | FAQ items | Function use history | Error history | History total |
|---|---|---|---|---|
| | 1. Do you want to know more information about the ScanSnap Organizer? | | | 0 |
| | 2. Where is file saved? And can it be saved in shared folder of network? | 3 | | 3 |
| | 3. File being thumb-nailed cannot be moved, resulting in error | | 42 | 42 |

| ScanSnap Organizer | FAQ items | Function use history | Error history | History total |
|---|---|---|---|---|
| | 1. Read business card images cannot be displayed. | | | 0 |
| | 2. Information such as the name or address read by the scanner cannot be displayed in the text window. | | 0 | 0 |
| | 3. Some items cannot be recognized. | | 53 | 53 |
| | 4. English business card is not recognized properly | | | |
| | 5. Business card information cannot be modified. | | | |
| | 6. The nomination cannot be displayed under the reduced image of business card information. | | | |
| | 7. Message that is read-only mode is displayed when update the business card database. | | | |
| | 8. What are applications that can be retrieved the string on the business card filing OCR Viewer by shortcut key "ALT+F3"? | | 4 | 4 |

Extraction condition→ Select top four which having more history totals

▨ : Results of selection

FIG. 13A

Extraction process 2: example of selecting a FAQ menu 114 based on call information Top menu displays "Frequently asked questions (Q&A)"

| | FAQ items | Call count | Helpful | Call information total |
|---|---|---|---|---|
| Read images | 1. Compression format and compression rate? | 1 | 15 | 16 |
| | 2. What is the resolution that can be set? | 7 | 4 | 11 |
| | 3. What are paper sizes that can be indicated? | 24 | 35 | 59 |
| | 4. What are sizes of the file to be saved? | 7 | 0 | 7 |
| | 5. How does the file name? | 3 | 9 | 12 |
| | 6. Is possible to darken color of the read images? | 0 | 13 | 13 |
| | 7. What are file formats that can be saved? | 0 | 0 | 0 |
| | FAQ items | Call count | Helpful | Call information total |
| Office collaboration functions | 1. Why do some paper read have low recognition rate when executing ⟨Conversion into Word document⟩, ⟨Conversion into Excel document⟩, or ⟨Conversion into Power Point document⟩? | 6 | 50 | 56 |
| | 2. The results do not improve when an image was made excellent while executing ⟨Conversion into Word document⟩, ⟨Conversion into Excel document⟩, or ⟨Conversion into Power Point document⟩. | 5 | 25 | 30 |
| | 3. The conversion (recognition) changed based on color mode (black-and-white, color, gray) or the setting of the image quality. Which settings are optimal? | 9 | 23 | 32 |
| | 4. ⟨Not enough memory!⟩ appeared when an image was made excelleNt while executing ⟨Conversion into Word document⟩, ⟨Conversion into Excel document⟩, or ⟨Conversion into Power Point document⟩. | 0 | 1 | 1 |
| | 5. The operation file has remained without being deleted when an image was made excelleNt while executing ⟨Conversion into Word document⟩, ⟨Conversion into Excel document⟩, or ⟨Conversion into Power Point document⟩. | 0 | 2 | 2 |

Extraction condition 1 → Extraction process 1 is excluded
Extraction condition 2 → Select top four which having more call information totals ▨ : Results of selection

FIG. 13B

| Mobile collaboration functions | FAQ items | Call count | Helpful | Call information total |
|---|---|---|---|---|
| | 1. Is collaboration with iPad, iPhone, and iPad touch possible? | 38 | 60 | 98 |
| | 2. Error messages of security displayed when launched the "Save to Mobile" in windows. | 26 | 21 | 47 |
| | 3. Computer and mobile device (iPad/iPhone/iPad touch/Android terminal) cannot be connected to each other. | 14 | 11 | 25 |
| | 4. Computer and mobile device (iPad/iPhone/iPad touch/Android terminal) cannot connect to each other, when the mobile save icon of taskbar of computer displayed a mark of prohibition. | 2 | 3 | 5 |

| ScanSnap Organizer | FAQ items | Call count | Helpful | Call information total |
|---|---|---|---|---|
| | 1. Do you want to know more information about the ScanSnap Organizer? | 4 | 24 | 28 |
| | 2. Where is file saved? And can it be saved in shared folder of network? | 2 | 50 | 52 |
| | 3. File being thumb-nailed cannot be moved, resulting in error | 35 | 43 | 78 |

| ScanSnap Organizer | FAQ items | Call count | Helpful | Call information total |
|---|---|---|---|---|
| | 1. Read business card images cannot be displayed. | 3 | 24 | 27 |
| | 2. Information such as the name or address read by the scanner cannot be displayed in the text window. | 1 | 21 | 22 |
| | 3. Some items cannot be recognized. | 5 | 43 | 48 |
| | 4. English business card is not recognized properly | 7 | 26 | 33 |
| | 5. Business card information cannot be modified. | 0 | 27 | 27 |
| | 6. The nomination cannot be displayed under the reduced image of business card information. | 0 | 12 | 12 |
| | 7. Message that is read-only mode is displayed when update the business card database. | 3 | 7 | 10 |
| | 8. What are applications that can be retrieved the string on the business card filing OCR Viewer by shortcut key "ALT+F3"? | 1 | 8 | 9 |

: Results of selection

Extraction condition 1 → Extraction process 1 is excluded
Extraction condition 2 → Select top four which having more call information totals

INFORMATION PROCESSING DEVICE, INFORMATION PROCESSING SYSTEM, AND COMPUTER READABLE MEDIUM

CROSS-REFERENCE TO RELATED APPLICATIONS

This application is based on and claims priority under 35 USC 119 from Japanese Patent Application No. 2013-057106 filed Mar. 19, 2013.

FIELD

The invention relates to an information processing device, an information processing system, and a computer readable medium.

BACKGROUND

Japanese Patent Application Laid-Open (JP-A) No. 2002-182811 discloses a software support system for supporting software to display a plurality of window screens on a screen of a computer such that processing may be performed on the respective window screens, the system including: ID acquisition portion that acquires an ID of the window screen currently being operated from among the unique IDs issued to the window screens; a user support database that accumulates support information pieces about the window screens in condition where they are correlated with the IDs unique to the window screens; search portion that searches the user support database based on the ID unique to the window screen currently being operated and acquired by the ID acquisition portion; and output portion that outputs the support information searched for.

Japanese Patent Application Laid-Open (JP-A) No. 1999-316636 discloses a manual display device that displays an initial setting process of a printer by directly activating a setup guide from a main body of a PC and installs a reference guide into the PC main body and then executes it to reference help information etc. about the printer such that updated information etc. of this help information in a Web server may be referenced appropriately.

SUMMARY

According to an aspect of the invention, there is provided an information processing device having: a distribution portion that distributes an update data to a client terminal updating, on the client terminal, a first manual information constituted as a structured document; a PDF generation portion that generates a PDF file having a second manual information updated with the update data; and a file storage portion that stores the PDF file generated by the PDF generation portion in a state allowing the client terminal which is a distribution destination of the update data to download the PDF file.

According to another aspect of the invention, there is provided an information processing system including a client terminal and an information processing device, wherein the information processing device has: a distribution portion that distributes an update data to the client terminal updating, on the client terminal, a first manual information constituted as a structured document; a PDF generation portion that generates a PDF file having a second manual information updated with the update data; and a file storage portion that stores the PDF file generated by the PDF generation portion in a state allowing the client terminal which is a distribution destination of the update data to download the PDF file, wherein the client terminal has: a structured document update portion that updates the manual information constituted as the structured document based on the update data distributed from the distribution portion; and a download portion that downloads the PDF file of the manual information stored in the file storage portion.

According to another aspect of the invention, there is provided a non-transitory computer-readable medium storing thereon a computer program that causes a computer to perform a method having: distributing an update data to a client terminal updating, on the client terminal, a first manual information constituted as a structured document; generating a PDF file having a second manual information updated with the update data; and registering the generated PDF file to a download site in a state allowing the client terminal which is a distribution destination of the update data to download the PDF file.

BRIEF DESCRIPTION OF THE DRAWINGS

Exemplary embodiments of the present invention will be described in detail based on the following figures.

FIG. 8A is one example of a manual data configuration;

FIG. 9 is one example of control information (Ini file);

FIG. 10 is an example of information of manual change/addition/deletion/PDF data items for each driver or software version number;

FIGS. 12A and 12B are examples of selecting an FAQ menu 114 based on device history information; and FIGS. 13A and 13B are examples of selecting the FAQ menu 114 based on call information.

DESCRIPTION OF EMBODIMENTS

The following will describe an embodiment of the invention with reference to the drawings.

Figure 1:
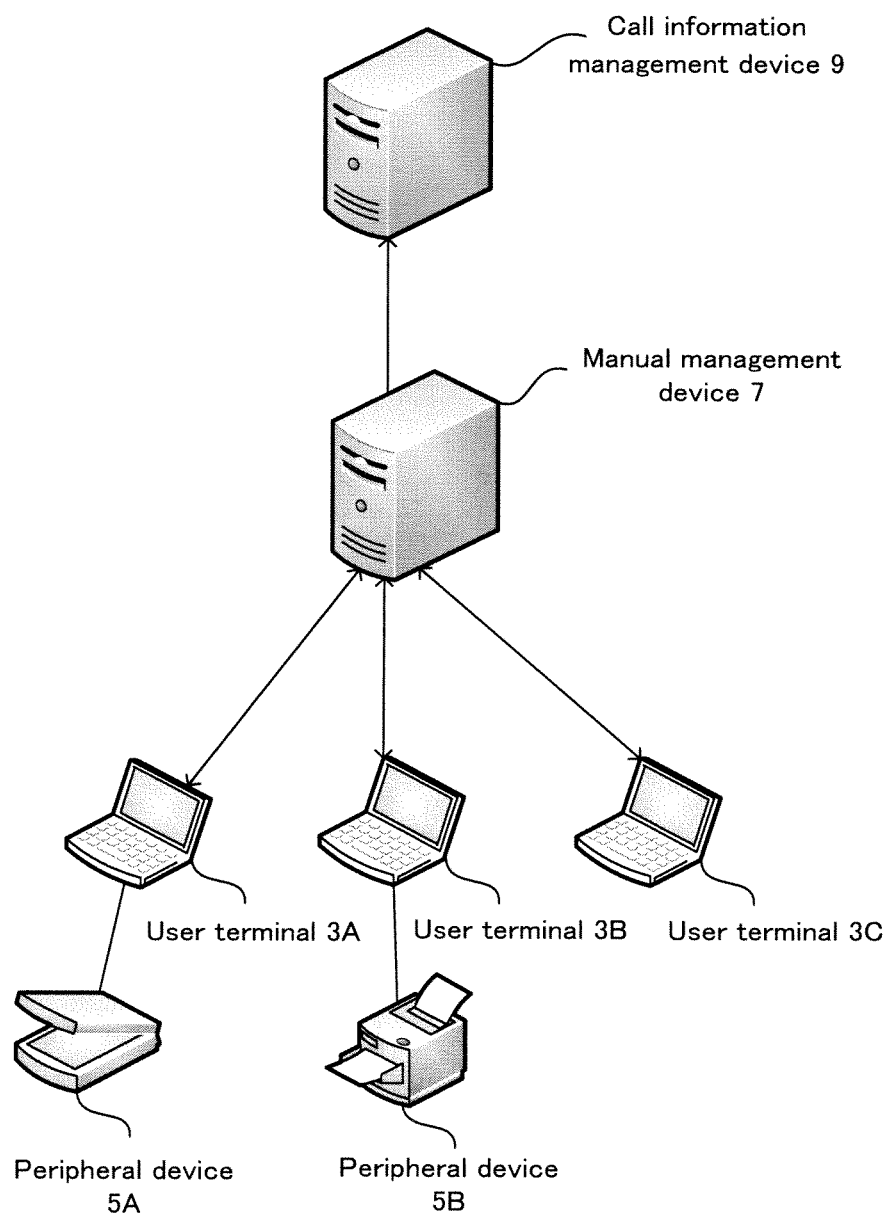
FIG. 1 is an explanatory diagram of an outline of a manual update system 1.

FIG. 1 is an explanatory diagram of the outline of a manual update system 1.

Figure 2:
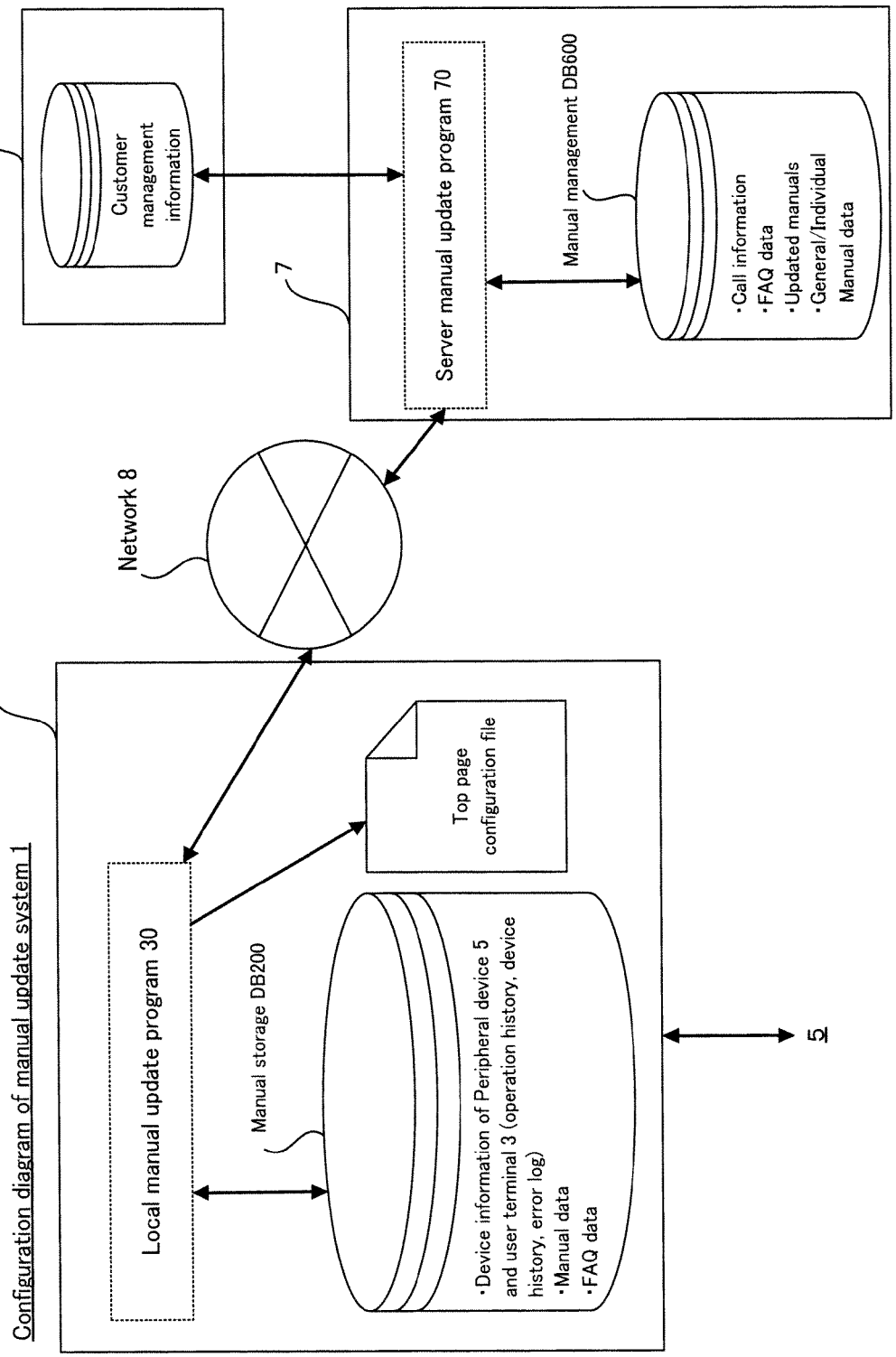
FIG. 2 is an explanatory diagram of a configuration of the manual update system 1.

FIG. 2 is an explanatory diagram of the configuration of the manual update system 1.

As illustrated in FIG. 1, the manual update system 1 of the present embodiment has user terminals 3A to 3C, peripheral devices 5A to 5B, a manual management device 7, and a call information management device 9.

As illustrated in FIGS. 1 and 2, a user terminal 3 is a computer terminal made up of a central processing unit, a main storage device, an external storage device, an input unit, and a monitor. The user terminal 3 connects to the manual management device 7 via a network 8 and to a peripheral device 5 via a connection cable.

The user terminal 3 is one example of a client terminal according to the invention such that a user of the user terminal 3 may view a manual on a manual display screen 11 (to be described later in FIG. 4) of the user terminal 3. The manual display screen 11 is the top page of a user interface configured to display manual information.

Further, the user terminal 3 selects a display menu (FAQ menu 114 to be described later) which appears on the manual display screen 11 and suits the user and updates it to the manual display screen 11 that contains the selected display menu. To "select a FAQ menu 114" here portion to select it as the candidate for a menu to be displayed on the manual display screen 11. An operation of the user to select a display menu (FAQ menu 114 to be described later) is referred to as a "selection operation" and distinguished from it.

Moreover, the user terminal 3 collects device information based on which the display menu is selected.

As illustrated in FIG. 2, the user terminal 3 has a manual storage database 200 (manual storage DB200). The manual storage DB200 stores device information, manual data, and FAQ data.

The device information refers to information about devices such as a software version number, an operation history, a device history, and an error log of the user terminal 3 or the peripheral device 5 (to be described later) or information about the device such as a manual version number of a manual stored in the user terminal 3. The software version number refers to the version information of driver software or application software installed in the user terminal 3. The operation history refers to the history of operations that the user performed on the user terminal 3 or the peripheral device 5. For example, the operation history includes the history of operations on the application software. The operation history in this example refers to the history of operations on collaboration software such as a scanner driver or optical character recognition (OCR) software. The device history refers to the information inside a device except errors. Specifically, the device history refers to OS information of the operating system (OS) installed in hardware or information set to the OS or the peripheral device 5. The error log refers to the history of errors occurring on the user terminal 3 or the peripheral device 5. The manual version number refers to the version information of manual data stored in the manual storage DB200. The manual data refers to a manual of machines, tools, or application software which is converted into data (format in which a computer can record/process it).

The peripheral device 5 is an external device connected to the user terminal 3. The peripheral device 5 is, for example, a scanner or a printer connected to the user terminal 3 via a network or a cable. The peripheral device 5 in this example is a scanner connected to the user terminal 3 via a universal serial bus (USB).

The call information management device 9 is a computer terminal for managing inquiry information by phone from the user and has server functions. The inquiry information is concerned with inquiries from the user about a device or software having a manual about it, and its concept includes, for example, contents themselves of inquiries by phone, answers to them, identification information to identify them, an inquiry frequency of the same inquiry contents, a frequency of helpful answering, an inquiry date, attributes of inquiry user (sex, age, or area), and their combinations. The call information management device 9 specifically manages such inquiry contents as contents of inquiries by phone from the user about a method of using the scanner or failures of the scanner.

Information (call information) about inquiries by phone from the user contains at least a plurality of different questions from the user, each of which questions contains its contents, the number of times of calling, which is the number of times of questioning, an answer to it, and the number of helpful answers (hereinafter referred to as helpful answer count). Those information pieces are input into the call information management device 9 by, for example, an operator accepting a call.

The manual management device 7 is a computer terminal having server functions and one example of an information processing device according to the invention.

The manual management device 7 distributes to the user terminal 3 update data to update a manual (HTML version) stored in the user terminal 3. Further, the manual management device 7 stores a manual for printing in condition where it can be downloaded and provides this printing manual in response to a request from the user terminal 3. The printing manual, referred to here, is given in, for example, a PDF format, namely the portable document format developed by Adobe.

As illustrated in FIG. 2, the manual management device 7 has a manual management database 600 (manual management DB600). The manual management DB600 stores call information, FAQ data, manual data, updated manuals, and general/individual manual data. The manual management DB600 is one example of file storage portion according to the invention.

Call information is concerned with inquiries by phone and contains, for example, at least the number of times of calling and the helpful answer count which are extracted by the manual management device 7 from the call information management device 9.

Figure 3:
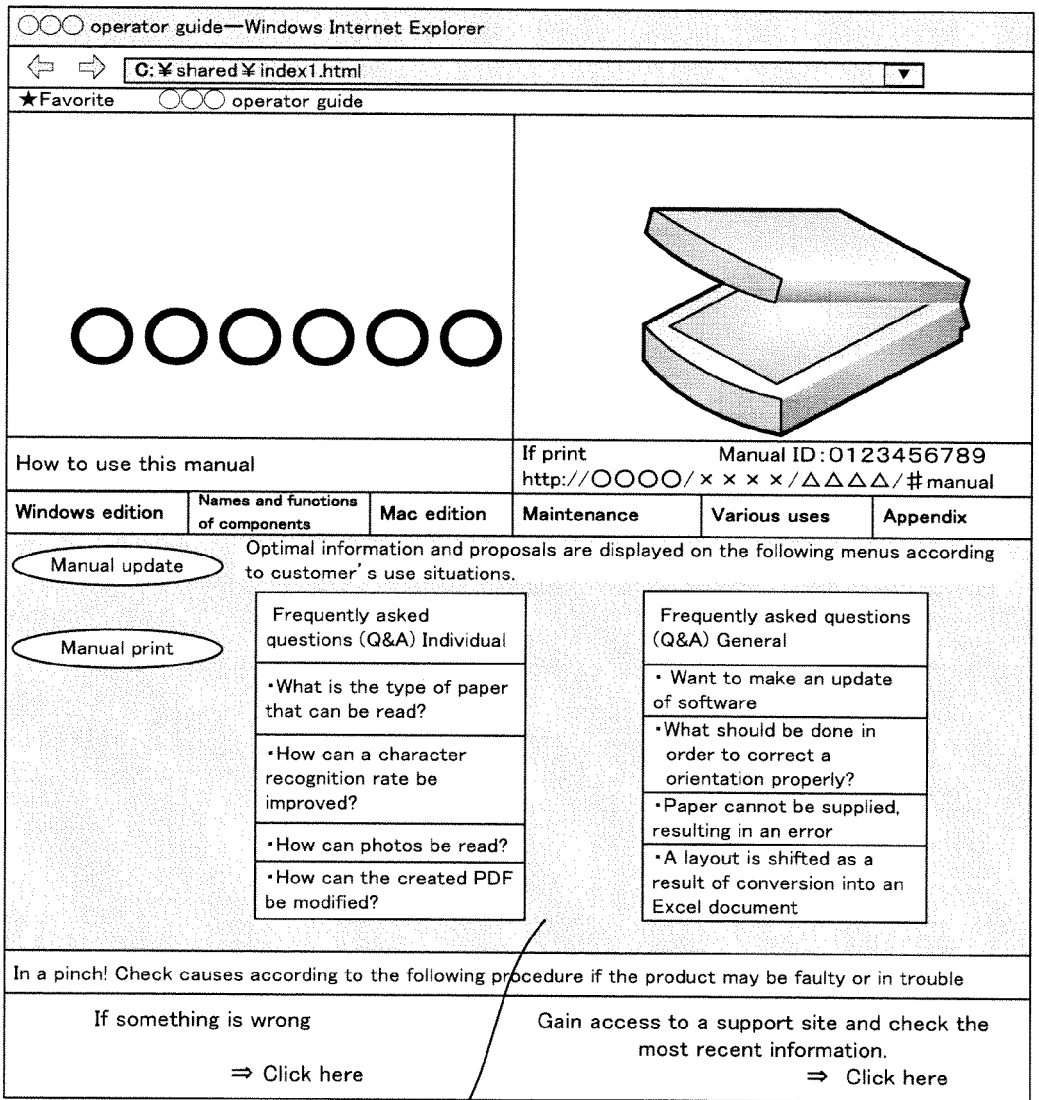
FIG. 3 is a table illustrating a manual display screen 11.

FIG. 3 is a table illustrating the manual display screen 11.

As illustrated in FIG. 3, the manual display screen 11 includes an updated portion 13 and a non-updated portion. The top page of the manual display screen 11 is made up of a top page configuration file. The top page configuration file is held by the user terminal 3. Moreover, the top page configuration file is updated by a local manual update program 30 (to be described later).

Figure 4:
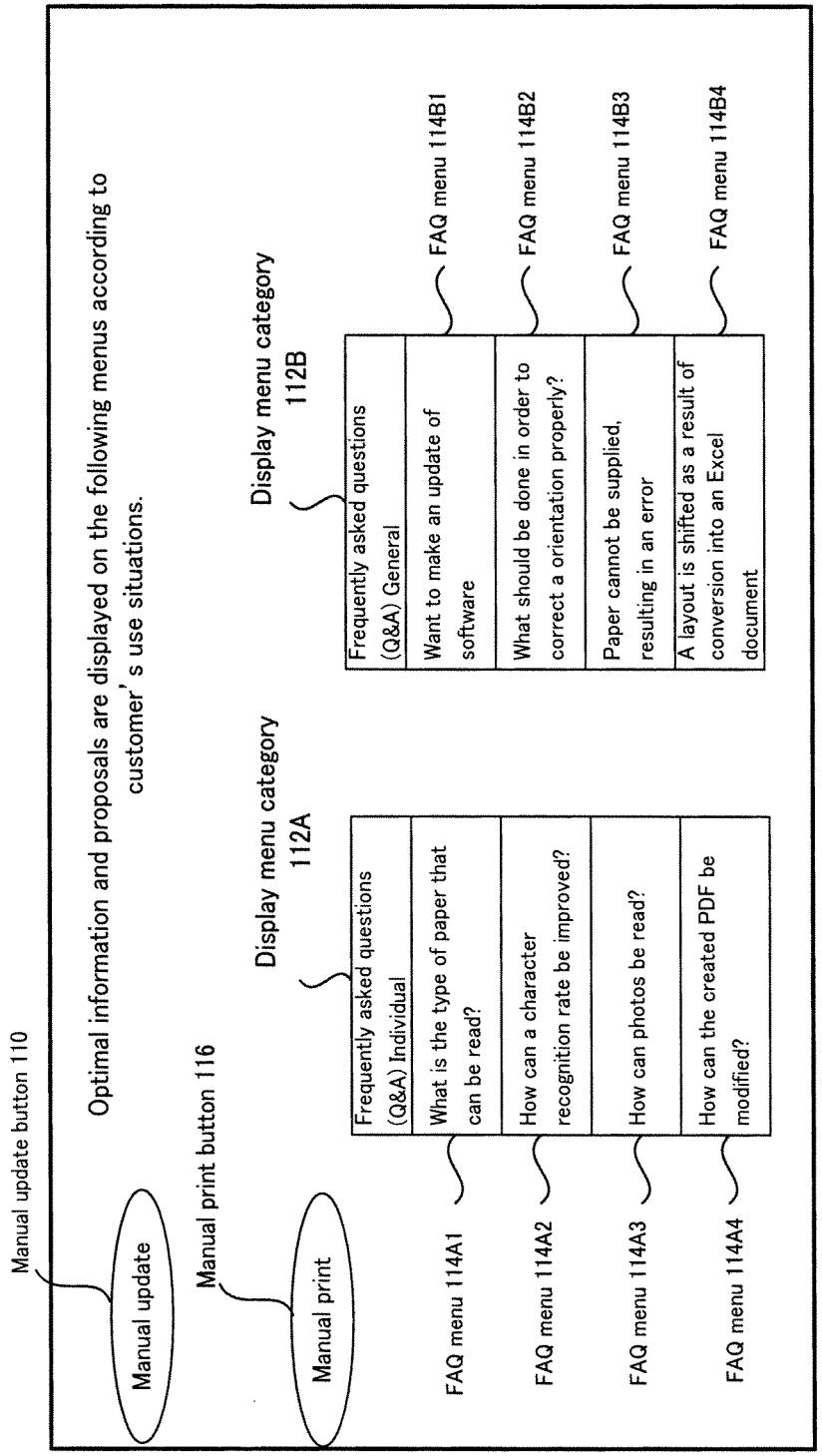
FIG. 4 is a table illustrating an updated portion 13 of the manual display screen 11.

FIG. 4 is a table illustrating the updated portion 13 of the manual display screen 11.

As illustrated in FIG. 4, the manual display screen 11 includes a manual update button 110, display menu categories 112A and 112B, FAQ menus 114A1 to 114A4, FAQ menus 114B1 to 114B4, and a manual print button 116.

The manual update button 110 is configured to trigger starting of processing to update the manual display screen 11. That is, if the manual update button 110 is pressed by the user, the user terminal 3 starts the processing to update the manual display screen 11.

The display menu category 112 gives classification titles of the classified FAQ menus 114 and, in this example, includes "Frequently asked questions (Q&A), Individual" and "Frequently asked questions (Q&A), General".

The FAQ menus 114A1 to 114A4 are the FAQ menus 114 belonging to the "Frequently asked questions (Q&A), Individual" menu 112A. The FAQ menus 114B1 to 114B4 are the FAQ menus 114 belonging to the "Frequently asked questions (Q&A), General" menu 112B.

The manual print button 116 triggers starting of processing to print a manual. That is, if the manual print button 116 is pressed by the user, the user terminal 3 starts processing to print a manual. More specifically, if the manual print button 116 is pressed by the user, the user terminal 3 starts to download the printing manual and prints the downloaded printing manual.

Figure 5:
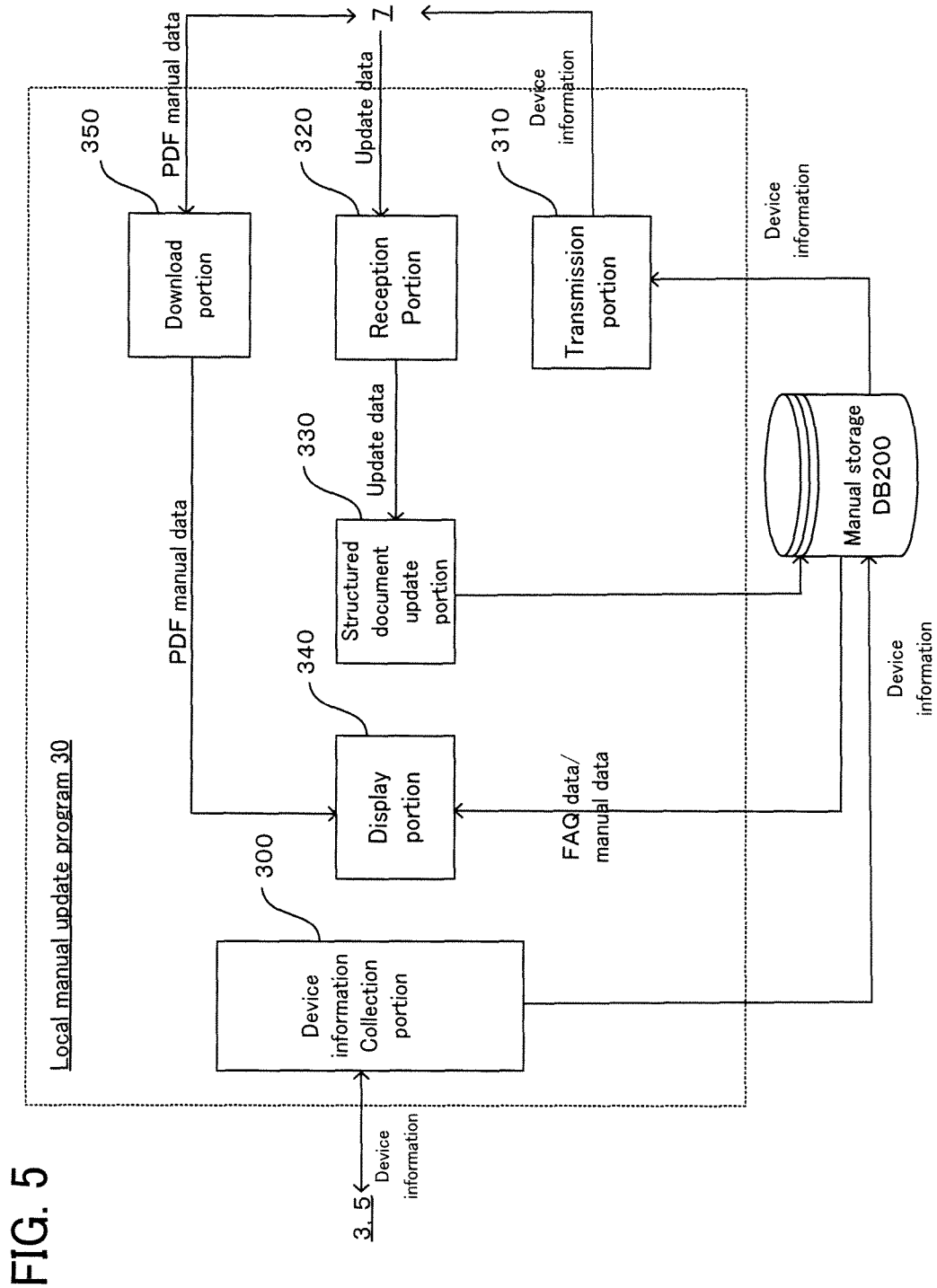
FIG. 5 is an explanatory diagram of a functional configuration of a local manual update program 30 of the manual update system 1.

FIG. 5 is an explanatory diagram of a functional configuration of the local manual update program 30 of the manual update system 1.

As illustrated in FIG. 5, the local manual update program 30 has a device information collection portion 300, a transmission portion 310, a reception portion 320, a structured document update portion 330, a display portion 340, and a download portion 350. The local manual update program 30 is installed in the user terminal 3 via a recording medium such as a CD-ROM, for example.

In the local manual update program 30, the device information collection portion 300 collects device information of the user terminal 3 or that of the peripheral device 5 connected to the user terminal 3.

Specifically, the device information collection portion 300 collects, at least, software version numbers, operation histories, device histories, error logs, and a manual version number of the user terminal 3 and the peripheral device 5 (scanner).

The device information collection portion 300 of this example functions if the manual update button 110 on the manual display screen 11 is pressed by the user. The device information collection portion 300 stores the software version numbers, the operation history information, the device history information, the error logs, and the manual version number collected from the user terminal 3 and the peripheral device 5 (scanner) in the manual storage DB200. The device information collection portion 300 is one example of version number identification portion according to the invention.

The transmission portion 310 transmits the device information (including the software version number and the manual version number) of the user terminal 3 or the peripheral device 5 collected by the device information collection portion 300 to the manual management device 7.

The reception portion 320 receives update data transmitted from the manual management device 7 and outputs the received update data to the structured document update portion 330.

The structured document update portion 330 updates manual information organized as a structured document, based on the update data distributed from the manual management device 7. The structured document is a document file structured using tags etc., for example, an HTML file.

Based on the update data input from the reception portion 320, the structured document update portion 330 of this example updates and saves the to-be-viewed manual data (HTML version) which is stored in the manual storage DB200.

The display portion 340 permits the user terminal 3 to display the manual display screen 11.

The display portion 340 of this example permits the user terminal 3 to display the manual display screen 11 based on the top page configuration file of the manual data updated in the structured document update portion 330.

The download portion 350 accesses the manual management device 7 to download a PDF file of the manual information as a printing manual.

For example, the download portion 350 transmits a manual ID for identifying a manual to the manual management device 7, and downloads the PDF file of a manual corresponding to this manual ID.

Triggered by pressing of the manual print button 116 on the display screen 11 by the user, the download portion 350 of this example transmits the manual ID to the manual management device 7, and downloads the PDF file of a manual that corresponds to the manual ID from the manual management device 7.

Figure 6:
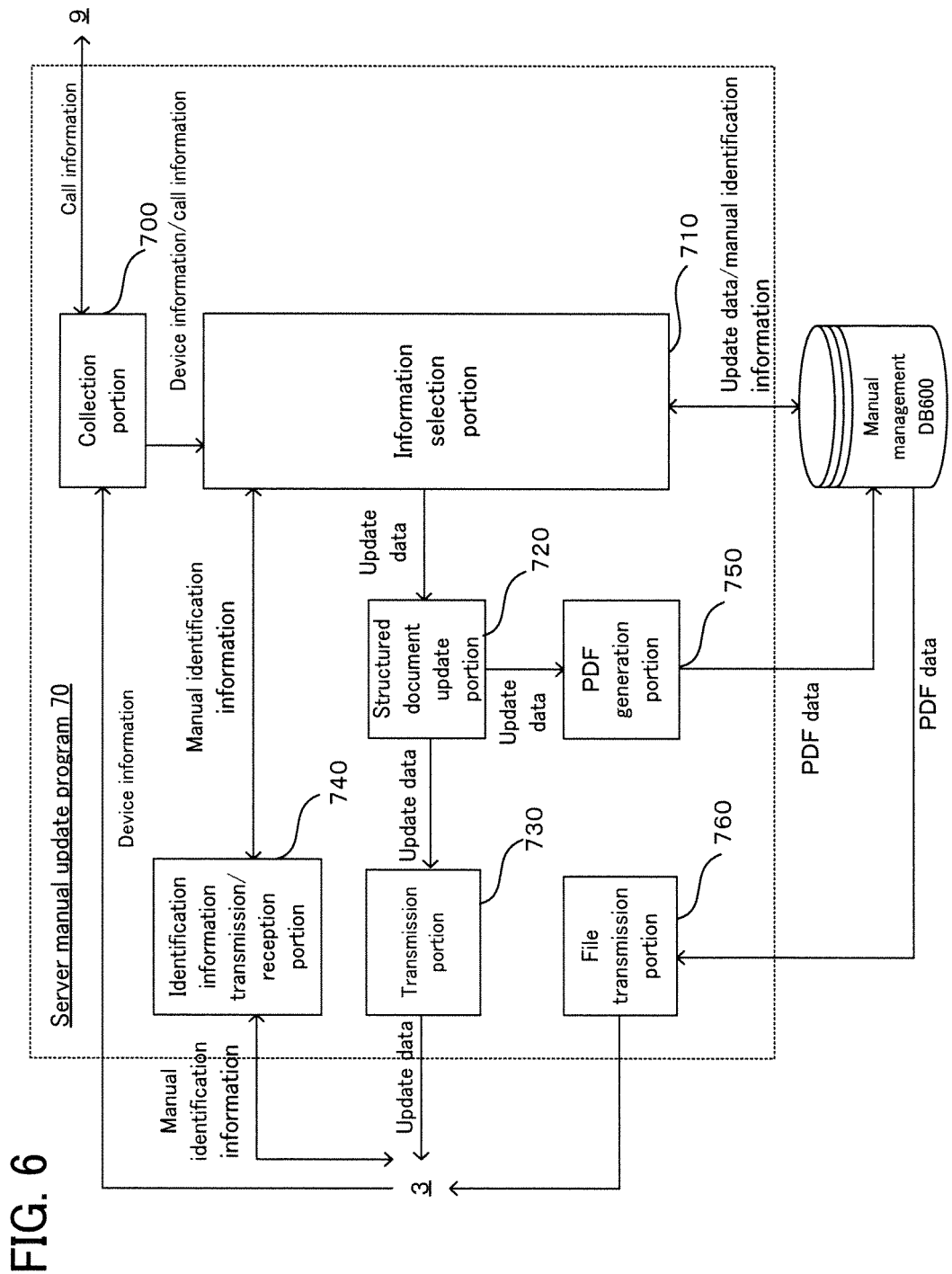
FIG. 6 is an explanatory diagram of a functional configuration of a server manual update program 70 of the manual update system 1.

FIG. 6 is an explanatory diagram of the functional configuration of a server manual update program 70.

As illustrated in FIG. 6, the server manual update program 70 has a collection portion 700, an information selection portion 710, a structured document generation portion 720, a transmission portion 730, an identification information transmission/reception portion 740, a PDF generation portion 750, and a file transmission portion 760. The server manual update program 70 is installed in the manual management device 7 via a recording medium such as a CD-ROM, for example.

The collection portion 700 receives device information (including a software version number and a manual version number) transmitted from the user terminal 3. Further, the collection portion 700 collects call information from the call information management device 9.

The collection portion 700 of this example collects a call count and a helpful answer count that correspond to an FAQ menu 114 selected by the information selection portion 710 (to be described later), from the call information management device 9. Moreover, the collection portion 700 notifies the information selection portion 710 of the call information collected from the call information management device 9.

The information selection portion 710 selects an FAQ menu 114 to be displayed on the display screen 11, based on the device information of the user terminal 3 or the peripheral device 5 and the call information.

For example, the information selection portion 710 selects an FAQ menu 114 from the manual management DB600 based on the device information collected by the collection portion 700.

The information selection portion 710 of this example selects FAQ menus 114 belonging to the display menu categories 112A and 112B from the manual management DB600 based on a function use history and an error history which are contained in the device information collected by the collection portion 700 and a call count and a helpful answer count which are contained in the collected call information.

The FAQ menus 114 selected on the basis of the device information are displayed on the "Frequently asked questions (Q&A), Individual" menu 112A and the FAQ menus 114 selected on the basis of the call information are displayed on the "Frequently asked questions (Q&A), General" menu 112B.

The information selection portion 710 notifies the structured document generation portion 720 of the selected FAQ menus 114. Further, the information selection portion 710 notifies the identification information transmission/reception portion 740 (to be described later) of the manual ID of a manual to be updated. Moreover, the information selection portion 710 searches for manual data to be correlated with the manual ID posted from the identification information transmission/reception portion 740 (to be described later) and posts the resultantly obtained manual PDF data to the file transmission portion 760 (to be described later).

The structured document generation portion 720 generates update data to update the manual data (HTML version) and adds the manual ID for identifying the manual corresponding to the update data to the updated data, namely the updated manual.

For example, the structured document generation portion 720 generates manual data newly created and to be registered in the manual management DB600, edition-revised manual data, and a top page configuration file in the HTML format, generating updated data corresponding to the updated portion.

The structured document generation portion 720 notifies the transmission portion 730 of the generated HTML-format updated data. The structured document generation portion 720 is one example of update portion according to the invention.

The transmission portion 730 distributes the update data to update the manual information organized as a structured document on the user terminal 3, to the user terminal 3.

The transmission portion 730 of this example transmits the update data generated by the structured document generation portion 720, to the user terminal 3. The transmission portion 730 is one example of distribution portion according to the invention.

The identification information transmission/reception portion 740 transmits the manual ID of the manual (HTML version) to be updated with the update data distributed to the user terminal 3 from the transmission portion 730, to this user terminal 3. That is, the identification information transmission/reception portion 740 transmits the manual ID of the manual to be updated with the update data to the user terminal 3 and, if the manual print button 116 is pressed by the user, receives a manual ID posted from the download portion 350 and posts the received manual ID to the information selection portion 710.

The PDF generation portion 750 generates a PDF file in which manual information is contained which has the same contents as the manual information updated with the update data posted from the information selection portion 710.

For example, the PDF generation portion 750 converts a variable portion of the manual that is changed for each user terminal into a PDF file and integrates a PDF file of the converted variable portion and a PDF file of a fixed portion prepared beforehand to generate a PDF file of the manual updated for each user terminal.

Figure 8B:
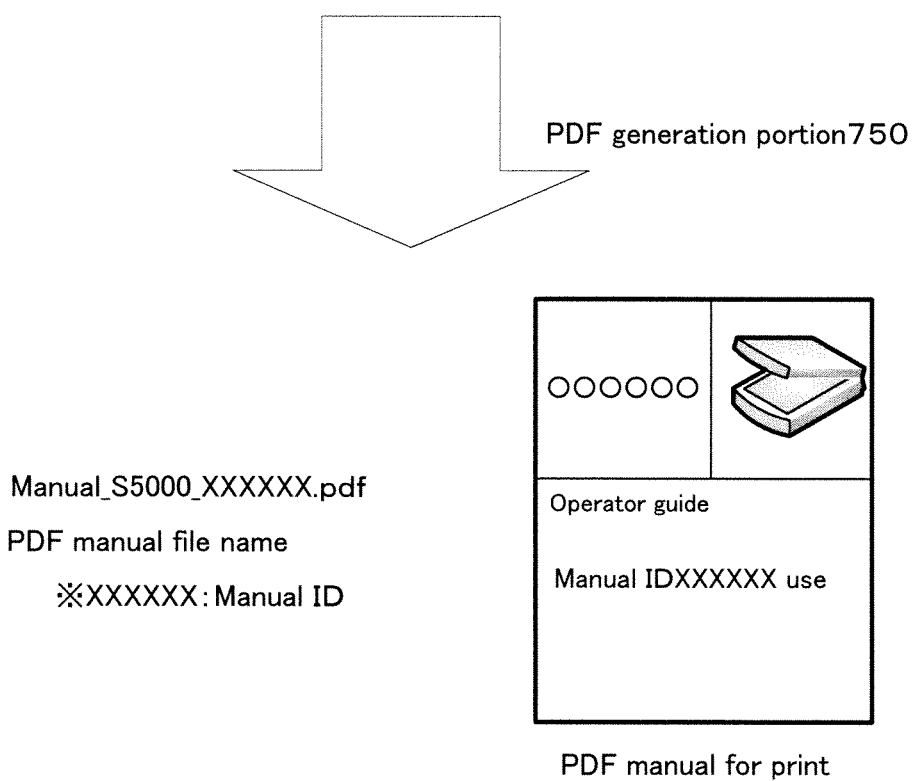
FIG. 8B is one example of a print-purpose manual file.

In this example, as illustrated in FIGS. 8A and 8B, a top page provides the variable portion which is updated for each user and the remaining portion provides the fixed portion, so that the PDF generation portion 750 converts only the top page of a manual generated by the structured document generation portion 720 into a PDF file, integrates the converted PDF file of the top page and the PDF file of the remaining portion prepared beforehand to generate a PDF file of the manual updated for each user terminal, and registers the generated PDF file of the manual in the manual management DB600 in condition where it is correlated with the manual ID.

The file transmission portion 760 reads the PDF file correlated with the manual ID received from the user terminal 3 from the manual management DB600 and transmits the read PDF file to this user terminal 3.

Figure 7:
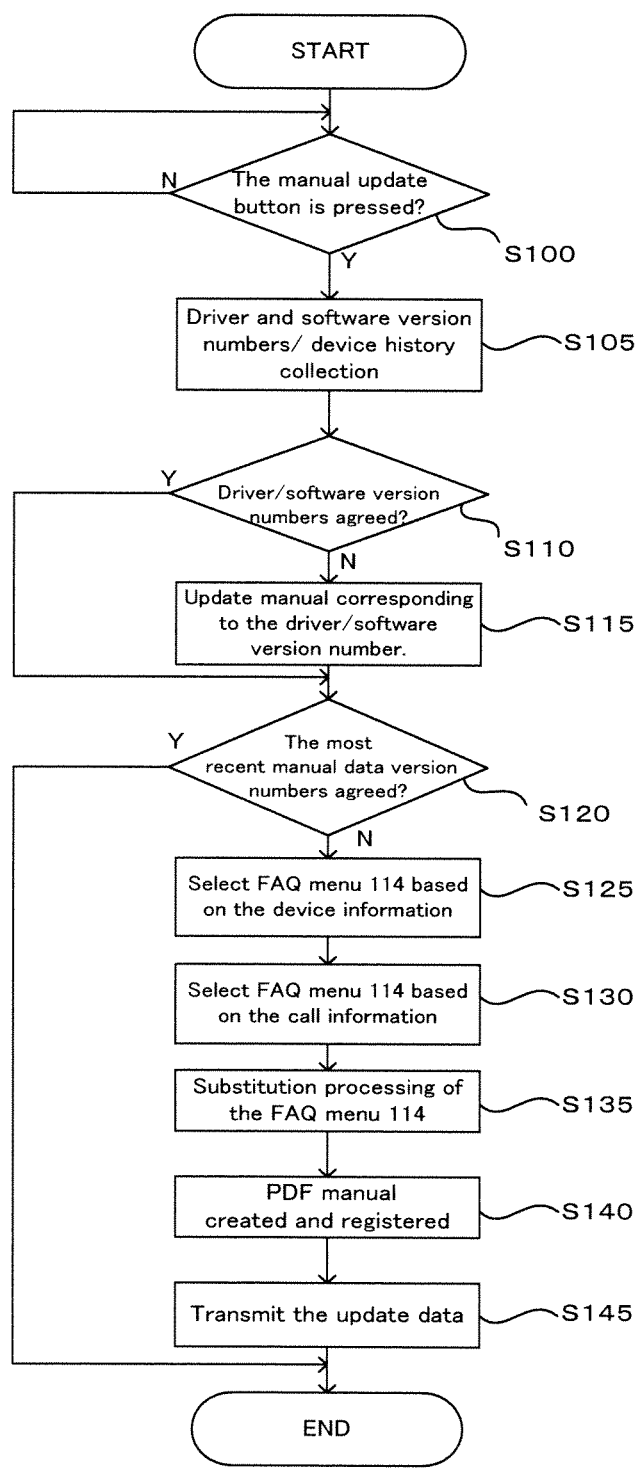
FIG. 7 is an explanatory flowchart of manual data update processing (S10)

FIG. 7 is an explanatory flowchart of processing to update an HTML version and a PDF version at the manual management device 7 (S10).

As illustrated in FIG. 7, having detected that the manual update button 110 is pressed by the user in step 100 (S100), the user terminal 3 starts manual data update processing and shifts to processing in S105.

In step 105 (S105), the collection portion 700 collects a software version number, an operation history, a device history, an error log, and a manual version number which are transmitted from the user terminal 3 and posts them to the information selection portion 710. Further, the collection portion 700 collects call information from the call information management device 9 and posts it to the information selection portion 710.

In step 110 (S110), the information selection portion 710 compares the collected software version number to the most recent software version number stored in the manual management DB600. If these software version numbers agree, the manual data update processing (S10) shifts to S120 and, if they disagree, shifts to S115.

In step 115 (S115), the information selection portion 710 references an update table illustrated in FIG. 10 and notifies the structured document generation portion 720 of change contents, addition contents, or deletion contents of a manual corresponding to the collected software version number. In this case, as illustrated in FIG. 10, the update table stores the change contents (portion to be replaced in the HTML version manual), the addition contents (portion to be added to the HTML version manual), the deletion contents (portion to be deleted from the HTML version manual), and PDF files of the manual which are updated in condition where they are correlated with the software version number.

The structured document generation portion 720 creates HTML-format update data (data file illustrated in FIG. 9) to update the manual based on the posted change contents, addition contents, or deletion contents of the manual.

Moreover, the information selection portion 710 posts the created update data to the PDF generation portion 750.

In step 120 (S120), the information selection portion 710 compares the collected manual version number to the most recent manual version number saved in the manual management DB600. If these manual version numbers agree, the manual data update processing (S10) ends and, if they disagree, shifts to S125.

In step 125 (S125), the information selection portion 710 selects an FAQ menu 114 as the "Frequently asked questions (Q&A), Individual" menu 112A from the manual management DB600 based on the operation history, the device history, and the error log and posts the selected FAQ menu 114 to the structured document generation portion 720.

In step 130 (S130), the information selection portion 710 selects an FAQ menu 114 as the "Frequently asked questions (Q&A), General" menu 112B from the manual management DB600 based on the call information and posts the selected FAQ menu 114 to the structured document generation portion 720.

In step 135 (S135), the structured document generation portion 720 creates HTML-format update data to update the "Frequently asked questions (Q&A), Individual" menu 112A based on the FAQ menu 114 selected in S125. Further, the structured document generation portion 720 creates HTML-format update data to update the "Frequently asked questions (Q&A), General" menu 112B based on the FAQ menu 114 selected in S130.

In step 140 (S140), the PDF generation portion 750 creates PDF data of the manual based on the update data posted from the information selection portion 710 and saves the created PDF data in the manual management DB600 in condition where it is correlated with the manual ID.

In step 145 (S145), the transmission portion 730 transmits the update data generated by the structured document generation portion 720 to the user terminal 3, while the identification information transmission/reception portion 740 transmits the manual ID of a manual corresponding to this update data to the user terminal 3.

Figure 11:
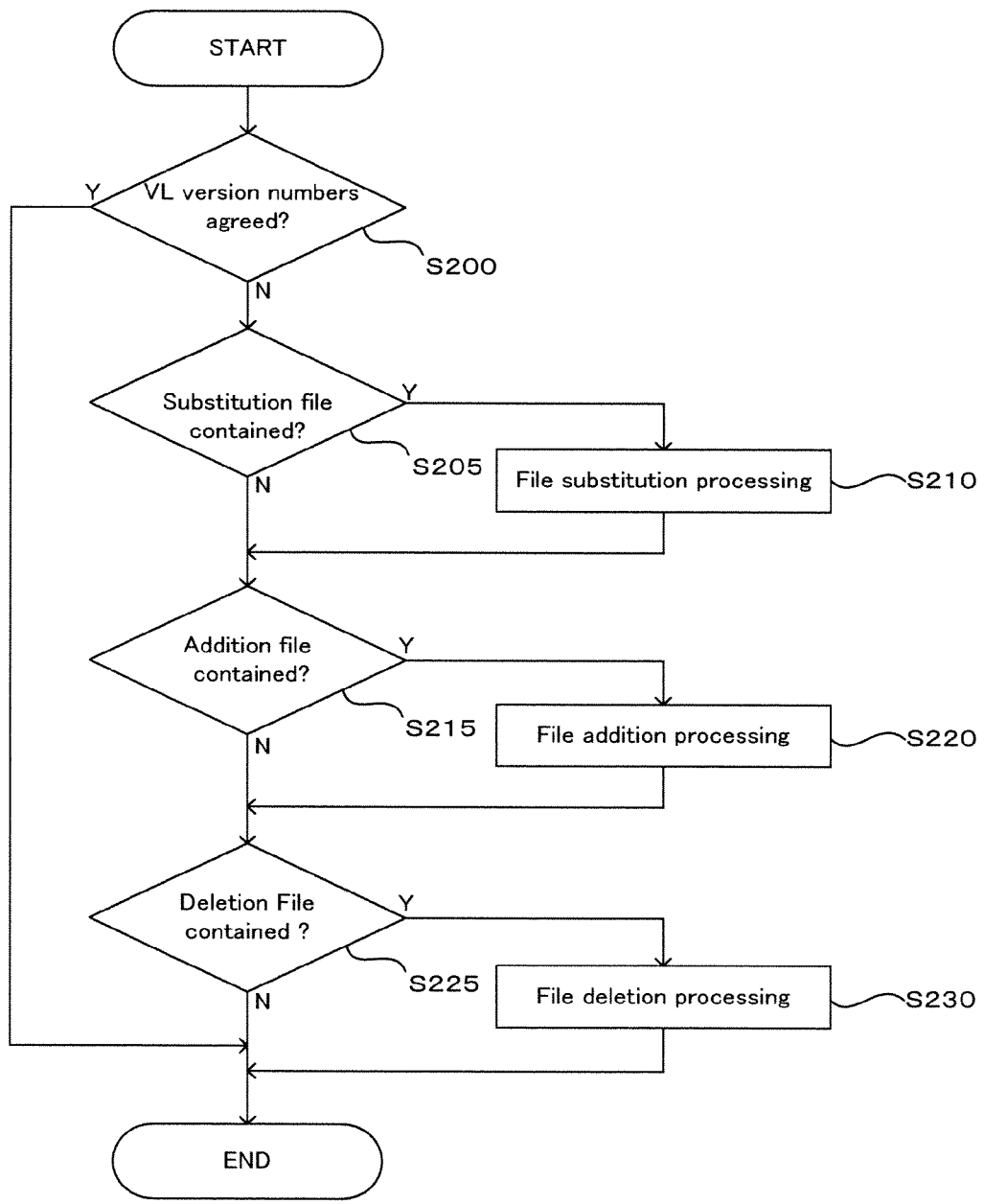
FIG. 11 is an explanatory flowchart of update processing (S20) based on the control information.

FIG. 11 is an explanatory flowchart of HTML version update processing (S20) at the user terminal 3.

As illustrated in FIG. 11, in step 200 (S200), the structured document update portion 330 compares a version number indicated by "VL" contained in control information of the update data illustrated in FIG. 9 to the version number of a manual saved in the manual storage DB200.

The update processing (S20) shifts to S205 if these manual version numbers disagree and ends if they agree.

In step 205 (S205), the structured document update portion 330 confirms "CHG_PARA" in the control information.

The update processing (S20) shifts to S210 if substitution file information is described in "CHG_PARA" and shifts to S215 if it is not described.

In step 210 (S210), the structured document update portion 330 substitutes a file described in "CHG_PARA" in the control information for the existing file of a manual (HTML version) held in the manual storage DB200.

In step 215 (S215), the structured document update portion 330 confirms "ADD_PARA" in the control information.

The update processing (S20) shifts to S220 if addition file information is described in "ADD_PARA" and shifts to S225 if it is not described.

In step 220 (S220), the structured document update portion 330 adds a file described in "ADD_PARA" in the control information to a manual (HTML version) held in the manual storage DB200.

In step 225 (S225), the structured document update portion 330 confirms "DEL_PARA" in the control information.

The update processing (S20) shifts to S230 if deletion file information is described in "DEL_PARA" and ends if it is not described.

In step 230 (S230), the structured document update portion 330 deletes a file described in "DEL_PARA" in the control information from a manual (HTML version) held in the manual storage DB200.

In such a manner, the user terminal 3 updates only the HTML-version manual based on the update data and downloads the updated PDF-version manual from the manual management device 7 based on the manual ID posted from the manual management device 7.

Thus, the manual update system 1 can provide the user with the same manual for printing (PDF version) as the manual being viewed with a Web browser without imposing a burden of costs for converting the updated portion into a PDF (for example, costs for purchasing an application program for creating PDF files, processing loads and work time for generation of PDF files, etc.) on the side of the user. It is well suited, in particular, for a case where manual contents are updated for each of the users based on the version number of software. Similarly, it is well suited also for a case where the top page is dynamically updated as described later, on the basis of device information or call information.

FIGS. 12A and 12B are examples of selecting an FAQ menu 114 based on device history information.

The information selection portion 710 outputs the number of function use history cases and the number of error history cases which correspond to an FAQ menu 114 based on device information collected by the collection portion 700. From the output number of function use history cases and number of error history cases, a history total (sum total) is calculated. For example, as illustrated in FIGS. 12A and 12B, the number of function use history cases answering "Compression format and compression rate?" in an FAQ item list about read images is "2" without error histories, so that in this case the history total is "2". In such a manner, the top four history totals calculated for each FAQ menu 114 are selected in a descending order. In FIGS. 12A and 12B, the top four history totals are "<Not enough memory!> appeared when an image was made excellent while executing <Conversion into Word document>, <Conversion into Excel document>, or <Conversion into Power Point document>", "Computer and mobile device (iPad/iPhone/iPad touch/Android terminal) cannot be connected to each other", "File being thumb-nailed cannot be moved, resulting in error", and "Some items cannot be recognized", which provide results of selecting the FAQ menu 114. The FAQ menu 114 selected on the basis of the device history information is displayed as "Frequently asked questions (Q&A), Individual" menu 112A on the display screen 11.

FIGS. 13A and 13B are examples of selecting a FAQ menu 114 based on call information.

The information selection portion 710 outputs a call count and a helpful answer count which correspond to an FAQ menu 114 based on call information collected by the collection portion 700. A call information total is calculated from the output call count and helpful answer count. For example, as illustrated in FIGS. 13A and 13B, the call count answering "Compression format and compression rate?" in an FAQ item list about read images is "1" and the helpful answer count for it is "15", so that the call information total is "16" in this case. In such a manner, the top four call information totals calculated for each FAQ menu 114 are selected in a descending order. In FIGS. 13A and 13B, the top four call information totals of "What are manuscript sizes that can be indicated?", "Why do some manuscripts read have low recognition rate when executing <Conversion into Word document>, <Conversion into Excel document>, or <Conversion into Power Point document>", "Is collaboration with iPad, iPhone, and iPad touch possible?", and "File being thumb-nailed cannot be moved, resulting in error" are selected once. However, "File being thumb-nailed cannot be moved, resulting in error" is already selected as the FAQ menu 114 of 112A and redundant and, therefore, provides the next-abundant call information total of "Where is file saved? And can it be saved in shared folder of network?", which provides results of selecting the FAQ menu 114. The FAQ menu 114 selected on the basis of the call information is displayed as "Frequently asked questions (Q&A), General" menu 112B on the display screen 11.

As described above, according to the manual update system 1 of the present embodiment, a manual can be updated in accordance with user-specific conditions (software version number, operation history, etc.), while the user terminal 3 can dynamically generate an updated manual (HTML version) based on update data distributed from the manual management device 7. Further, if the user demands a printing manual, the user terminal 3 can download an updated manual (PDF version) from the manual management device 7 based on a manual ID posted from the manual management device 7.

Thus, the manual update system 1 can provide the user with the same manual for printing (PDF version) as the manual being viewed with a Web browser without imposing a burden of costs for converting the updated portion into a PDF (for example, costs for purchasing an application program for creating PDF files, processing loads and work time for generation of PDF files, etc.) on the side of the user. It is well suited, in particular, for a case where manual contents are updated based on the user-specific conditions such as a software version number and an operation history.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing device comprising:
a processor programmed to:
  distribute an update data to a client terminal updating, on the client terminal, manual information constituted as a structured document, and
  generate, based on the update data, a PDF file having the manual information updated with the update data; and
a storage that stores the generated PDF file in a state of correlation with manual identification information to identify the manual information,
wherein the processor is further programmed to:
  transmit to the client terminal the manual identification information for the manual information which is updated with the update data distributed to the client terminal,
  transmit to the client terminal the PDF file correlated with the manual identification information received from the client terminal,
  collect device information indicating a history of operations at the client terminal or inquiry information from a customer,
  update contents of the manual information for the sake of each of the client terminals based on the device information or the inquiry information, and
  distribute the update data to the client terminal to update the manual information on the client terminal into the updated manual information,
wherein the manual information contains a variable portion which is changed for each of the client terminals and a fixed portion which is not changed for each of the client terminals, and
wherein the processor is further programmed to:
  update the variable portion of the manual information for the sake of each of the client terminals based on the device information indicating the history of operations at the client terminal or the inquiry information from the customer, and
  generate the PDF file corresponding to the variable portion of the updated manual information and integrate the PDF file of the generated variable portion and the PDF file of the fixed portion prepared beforehand.

2. The information processing device according to claim 1, wherein the processor is further programmed to identify a version number of software installed in the client terminal, select the update data in accordance with the identified version number, and distribute the selected update data.

3. An information processing system including a client terminal and an information processing device, wherein the information processing device comprises
a first processor configured to:
  distribute an update data to the client terminal updating, on the client terminal, manual information constituted as a structured document; and
  generate, based on the update data, a PDF file having the manual information updated with the update data; and
a storage that stores the generated PDF file in a state of correlation with manual identification information to identify the manual information,
wherein the first processor is further programmed to:
  transmit to the client terminal the manual identification information for the manual information which is updated with the update data distributed to the client terminal;
  transmit to the client terminal the PDF file correlated with the manual identification information received from the client terminal;
  collect device information indicating a history of operations at the client terminal or inquiry information from a customer;
  update contents of the manual information for the sake of the client terminal based on the device information or the inquiry information; and
  distribute the update data to the client terminal to update the manual information on the client terminal into the updated manual information;
wherein the manual information contains a variable portion which is changed for he client terminal and a fixed portion which is not changed for the client terminal, and
wherein the first processor is further programmed to:
  update the variable portion of the manual information for the sake the client terminal based on the device information indicating the history of operations at the client terminal or the inquiry information from the customer; and
  generate the PDF file corresponding to the variable portion of the updated manual information and integrate the PDF file of the generated variable portion and the PDF file of the fixed portion prepared beforehand, and
the client terminal comprises a second processor programmed to:
  update the manual information constituted as the structured document based on the distributed update data; and
  download the PDF file of the manual information stored in the storage.

4. A non-transitory computer-readable medium storing thereon a computer program that causes a computer to perform a method comprising:
  distributing an update data to a client terminal updating, on the client terminal, manual information constituted as a structured document;
  generating, based on the update data, a PDF file having the manual information updated with the update data;
  registering the generated PDF file to a download site in a state of correlation with manual identification information to identify the manual information;
  transmitting to the client terminal the manual identification information for the manual information which is updated with the update data distributed to the client terminal;
  transmitting to the client terminal the PDF file correlated with the manual identification information received from the client terminal;
  collecting device information indicating a history of operations at the client terminal or information of inquiries from a customer;

updating contents of the manual information for the sake of each of the client terminals based on the device information or the inquiry information; and distributing the update data to the client terminal to update the manual information on the client terminal into the updated manual information, wherein the manual information contains a variable portion which is changed for each of the client terminals and a fixed portion which is not changed for each of the client terminals, and wherein the method further comprises:

updating the variable portion of the manual information for the sake of each of the client terminals based on the device information indicating the history of operations at the client terminal or the inquiry information from the customer; and generating the PDF file corresponding to the variable portion of the updated manual information and integrate the PDF file of the generated variable portion and the PDF file of the fixed portion prepared beforehand.

* * * * *